United States Patent Office 2,781,347
Patented Feb. 12, 1957

2,781,347
3-ACYLAMIDORHODANINES AND PROCESS FOR PREPARATION

Richard E. Strube, Kalamazoo, Mich., assignor to The Upjohn Company, Kalamazoo, Mich., a corporation of Michigan No Drawing. Application November 7, 1955, Serial No. 545,575

9 Claims. (Cl. 260—295)

This invention relates to an organic process and compounds obtained therein, and is more particularly concerned with a process for the production of 3-acylamidorhodanines and novel products thereof.

It is an object of this invention to provide a novel and useful process for the production of 3-acylamidorhodanines. Another object is the provision of novel and useful 3-acylamidorhodanines. Other objects of this invention will be apparent to those skilled in the art to which this invention pertains.

The process of this invention is carried out by reacting a carboxylic acid hydrazide with a trithiocarbodiglycolic acid in an aqueous medium to produce the corresponding 3-acylamidorhodanine. The process may be illustrated by the following reaction scheme:

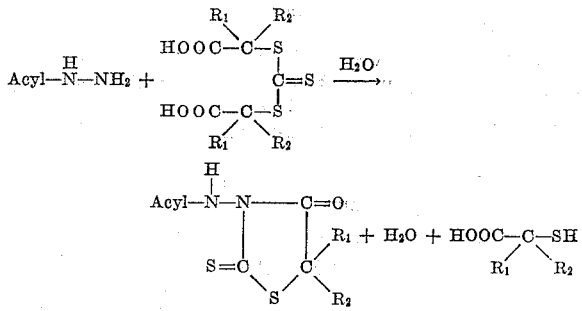

The term "acyl" is used herein to designate the acyl radical of a carboxylic acid, for example, acetic, propionic, hexanoic, n-dodecanoic, benzoic, α-naphthoic, p-nitrobenzoic, isonicotinic, phenylacetic, α-naphthyl acetic, and the like. Advantageously, the acyl radical does not contain more than twelve carbon atoms. The radicals $R_1$ and $R_2$ can be hydrogen or lower saturated hydrocarbyl. The term "lower saturated hydrocarbyl" is used to designate saturated hydrocarbon radicals having no more than twelve carbon atoms, and is inclusive of methyl, ethyl, propyl, isopropyl, n-butyl, n-dodecyl, cyclopentyl, phenyl, benzyl, naphthyl, and the like. The acyl radical and the radicals $R_1$ and $R_2$ remain unchanged during the reaction.

The process of this invention is useful in preparing 3-acylamidorhodanines as exemplified in the examples hereinafter set forth, which have antibacterial, antifungal and antinematodal activity. Thus, 3-acylamidorhodanines prepared by the process of this invention, especially 3-isonicotinamidorhodanine, can be used in substantially the same manner as disclosed in U. S. Reissue Patent 23,947; they can also be used as agricultural protectants and for this purpose can be applied as common in the art and illustrated specifically in U. S. Patent 2,635,978.

The reaction is advantageously carried out in water or in aqueous solution of methyl alcohol, ethyl alcohol, dioxane, tetrahydrofuran, and the like. The reaction may be carried out at temperatures ranging between about fifty and 150 degrees centigrade, preferably between 75 and 125 degrees centigrade. In many instances, the reflux temperature of the solution at atmospheric pressure is very convenient.

The trithiocarbodiglycolic acids of this invention can be prepared by any of the various methods described in the literature; see Beilsteins Handbuch der Organischen Chemie, fourth edition, 1921, vol. 3, pages 252 and 291. The preferred method comprises condensing potassium trithiocarbonate and the appropriate α-halo carboxylic acid which has been neutralized with sodium or potassium carbonate. Thus, if unsubstituted trithiocarbodiglycolic acid is desired, the preferred starting material is monochloroacetic acid; if the α,α'-dimethyl derivative is desired, then either α-bromopropionic acid or α-chloropropionic acid is used as starting material. Other suitable starting acids include α-bromobutyric acid, α-bromoisobutyric acid, α-bromo-α-methyl-n-butyric acid, α-bromo-n-valeric acid, α-bromoisovaleric acid, α-bromohexanoic acid, α-bromophenylacetic acid, α-bromohydrocinnamic acid, α-bromododecanoic acid, α-bromotetradecanoic acid, α-bromo-α(1-naphthyl)-acetic acid and the like. These acids give the corresponding substituted trithiocarbodiglycolic acids.

The novel compounds of this invention may be combined with solid or liquid pharmaceutical carriers and formulated into the form of tablets, powder packets, or capsules, or dissolved or suspended in suitable solvents, such as sterile water, for administration to humans or animals.

The following examples are illustrative of the present invention but are not to be construed as limiting:

Example 1.—3-benzamidorhodanine

In a fifty milliliter round-bottomed flask, provided with a reflux condenser, was placed a solution of 0.68 gram (0.0050 mole) of benzoic acid hydrazide in forty milliliters of water. To the solution was added 1.13 grams (0.0050 mole) of trithiocarbodiglycolic acid and the mixture was heated on the steam bath for one hour. At that time pale-yellow crystals were present. The solution was cooled in an ice-bath and filtered. The product was dried in vacuo at 75 degrees centigrade and weighed 1.0 gram. Recrystallization from dilute alcohol gave 0.7 gram (55 percent) of 3-benzamidorhodanine having a slightly yellow color and melting at 182-183 degrees centigrade.

Analysis.—Calcd. for $C_{10}H_8N_2O_2S_2$: C, 47.60; H, 3.19; N, 11.10; S, 25.41. Found: C, 47.98; H, 3.22; N, 11.69; S, 25.73.

This product, 3-benzamidorhodanine, showed complete in vitro inhibition of Mycobacterium tuberculosis (H37Rv) at 0.5 milligram per milliliter.

Example 2.—3-(p-nitrobenzamido)-rhodanine

In a one liter round-bottomed flask, fitted with a reflux condenser, were placed a hot suspension of 9.6 grams (0.053 mole) of p-nitrobenzoic acid hydrazide in 200 milliliters of water and a hot solution of 11.3 grams (0.050 mole) of trithiocarbodiglycolic acid in 300 milliliters of water. A clear yellow solution was formed and after heating on the steam bath for about five minutes a precipitate began to appear. Heating was continued for one hour and then, the reaction mixture was cooled and filtered. The slightly yellow product, 3-(p-nitrobenzamido)-rhodanine, was dried in vacuo, weighed 12.7 grams (85 percent) and melted at 208-209 degrees centigrade with decomposition after darkening at about 204 degrees centigrade.

By concentrating the mother liquor in vacuo to about 100 milliliters, 1.2 grams of the 3-(p-nitrobenzamido)- rhodanine could be isolated, increasing the yield to 93 percent.

*Analysis.*—Calcd. for $C_{10}H_7N_3O_4S_2$: C, 40.39; H, 2.37; N, 14.14; S, 21.57. Found: C, 40.97; H, 2.41; N, 14.15; S, 21.85.

The infrared spectrum was in agreement with the structure of this compound.

This product, 3-(p-nitrobenzamido)-rhodanine, showed complete in vitro inhibition of *Mycobacterium tuberculosis* (H37Rv) at 0.5 milligram per milliliter.

Example 3.—3-isonicotinamidorhodanine

In a one liter round-bottomed flask provided with a reflux condenser, were dissolved 13.7 grams (0.10 mole) of isonicotinic acid hydrazide in 100 milliliters of water. The warm solution was at once added to 22.6 grams (0.10 mole) of trithiocarbodiglycolic acid dissolved in 400 milliliters of water. The solution was then heated on the steam bath for two and one half hours. After standing at room temperature for twenty hours the yellow precipitate was removed by filtration with suction and dried in vacuo over calcium chloride. The yield was 17.9 grams (70 percent). The product was purified by dissolving in 25 milliliters of dimethylformamide on the steam bath. The solution was cooled, filtered with suction and 25 milliliters of distilled water was added to the filtrate under vigorous stirring. After cooling with ice, filtering with suction and drying in vacuo over calcium chloride, 14.0 grams (55 percent) of a slightly yellow colored product was obtained. The purification was repeated giving 12.8 grams (50 percent) of 3-isonicotinamidorhodanine melting at 196–198 degrees centigrade with decomposition and darkening slowly at a lower temperature.

*Analysis.*—Calcd. for $C_9H_7N_3O_2S_2$: C, 42.67; H, 2.78; N, 16.59; S, 25.32. Found: C, 43.04; H, 2.25; N, 16.56; S, 24.92.

The infrared spectrum was in agreement with the expected formula.

This product, 3-isonicotinamidorhodanine, showed complete in vitro inhibition of *Mycobacterium tuberculosis* (H37Rv) at 0.5 milligram per milliliter. In vivo tests in mice gave a maximum tolerated dose of more than 500 milligrams per kilogram per day for ten days subcutaneously and 400 milligrams per kilogram per day for ten days orally. A group of mice previously infected with *Mycobacterium tuberculosis* (H37Rv) was treated subcutaneously with 500 milligrams of this product per kilogram per day for ten days; another group of similarly infected mice was treated orally with 200 milligrams per kilogram per day for ten days. The increase in the mean survival time of the treated mice compared with the infected untreated controls was five and a half days for subcutaneous treatment and three days for oral treatment.

Example 4.—5-methyl-3-benzamidorhodanine

In the same manner as given in Example 1, 5-methyl-3-benzamidorhodanine is prepared by the reaction, in an aqueous solution, of benzoic acid hydrazide and $\alpha,\alpha'$-dimethyltrithiocarbodiglycolic acid, the condensation product of $\alpha$-bromopropionic acid and potassium trithiocarbonate.

Example 5.—5,5-dimethyl-3-benzamidorhodanine

In the same manner as given in Example 1, 5,5-dimethyl-3-benzamidorhodanine is prepared by the reaction, in an aqueous solution, of benzoic acid hydrazide and $\alpha,\alpha,\alpha',\alpha'$-tetramethyltrithiocarbodiglycolic acid, the condensation product of $\alpha$-bromoisobutyric acid and potassium trithiocarbonate.

Example 6.—5-ethyl-3-isonicotinamidorhodanine

In the same manner as given in Example 3, 5-ethyl-3-isonicotinamidorhodanine is prepared by the reaction, in an aqueous solution, of isonicotinic acid hydrazide and $\alpha,\alpha'$-diethyltrithiocarbodiglycolic acid, the condensation product of $\alpha$-bromo-n-butyric acid and potassium trithiocarbonate.

Example 7.—5-phenyl-3-isonicotinamidorhodanine

In the same manner as given in Example 3, 5-phenyl-3-isonicotinamidorhodanine is prepared by the reaction, in an aqueous solution, of isonicotinic acid hydrazide with $\alpha,\alpha'$-diphenyltrithiocarbodiglycolic acid, the condensation product of $\alpha$-bromo-phenylacetic acid and potassium trithiocarbonate.

Example 8.—5-benzyl-3-isonicotinamidorhodanine

In the same manner as given in Example 3, 5-benzyl-3-isonicotinamidorhodanine is prepared by the reaction, in an aqueous solution, of isonicotinic acid hydrazide with $\alpha,\alpha'$-dibenzyltrithiocarbodiglycolic acid, the condensation product of $\alpha$-bromo-hydrocinnamic acid and potassium trithiocarbonate.

The compounds exemplified above can be used as agricultural protectants in compositions and applied as common in the art, illustrated specifically in U. S. Patent 2,635,978. The compounds of this invention, especially 3-isonicotinamidorhodanine, can be used in substantially the same manner as disclosed in U. S. Reissue Patent 23,947.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the production of 3-acylamidorhodanines, which comprises heating a carboxylic acid hydrazide with a trithiocarbodiglycolic acid in an aqueous medium to produce the corresponding 3-acylamidorhodanine.

2. A process for the production of 3-acylamidorhodanines of the formula:

$$\text{Acyl}-\overset{H}{\underset{}{N}}-N-\underset{\underset{S}{\overset{\|}{S=C}}\diagdown_{S}\diagup\overset{O}{\underset{R_2}{\diagup}}}{\overset{}{C=O}}\overset{R_1}{\diagup}$$

wherein Acyl is the acyl radical of a carboxylic acid having no more than twelve carbon atoms, and $R_1$ and $R_2$ are selected from the group consisting of hydrogen and saturated hydrocarbyl radicals having no more than twelve carbon atoms, which comprises reacting a trithiocarbodiglycolic acid of the formula:

$$\text{HOOC}-\underset{R_2}{\overset{R_1}{\underset{|}{\overset{|}{C}}}}-S-\underset{S}{\overset{\|}{C}}-S-\underset{R_2}{\overset{R_1}{\underset{|}{\overset{|}{C}}}}-\text{COOH}$$

wherein $R_1$ and $R_2$ are as above defined, with the hydrazide of a carboxylic acid having no more than twelve carbon atoms in an aqueous medium, to produce the corresponding 3-acylamidorhodanine.

3. A process for the production of 3-benzamidorhodanine which comprises heating benzoic acid hydrazide with trithiocarbodiglycolic acid in an aqueous medium to produce 3-benzamidorhodanine.

4. A process for the production of 3-(p-nitrobenzamido)-rhodanine which comprises reacting p-nitrobenzoic acid hydrazide with trithiocarbodiglycolic acid in an aqueous medium to produce 3-(p-nitrobenzamido)-rhodanine.

5. A process for the production of 3-isonicotinamidorhodanine which comprises reacting isonicotinic acid hydrazide with trithiocarbodiglycolic acid in an aqueous medium to produce 3-isonicotinamidorhodanine.

6. 3-acylamidorhodanines wherein the acylamido radical is selected from the group consisting of benzamido, p-nitrobenzamido and isonicotinamido radicals.

7. 3-benzamidorhodanine.

8. 3-(p-nitrobenzamido)-rhodanine.

9. 3-isonicotinamidorhodanine.

References Cited in the file of this patent

Sytnik et al.: Chem. Abst., vol. 46, cols. 7445–46 (1952).